INVENTOR

JAMES G. PECK JR.

BY

ATTORNEYS

Sept. 12, 1972 J. G. PECK. JR 3,691,036

METHOD OF OPERATING A MERCURY-AMALGAM CATHODE ELECTROLYTIC CELL

Filed March 9, 1970 4 Sheets-Sheet 2

INVENTOR
JAMES G. PECK JR

BY

Chittick and Spaeth
ATTORNEYS

Sept. 12, 1972 J. G. PECK. JR 3,691,036

METHOD OF OPERATING A MERCURY-AMALGAM CATHODE ELECTROLYTIC CELL

Filed March 9, 1970 4 Sheets-Sheet 3

INVENTOR

JAMES G. PECK JR.

BY

Chisholm and Spencer

ATTORNEYS

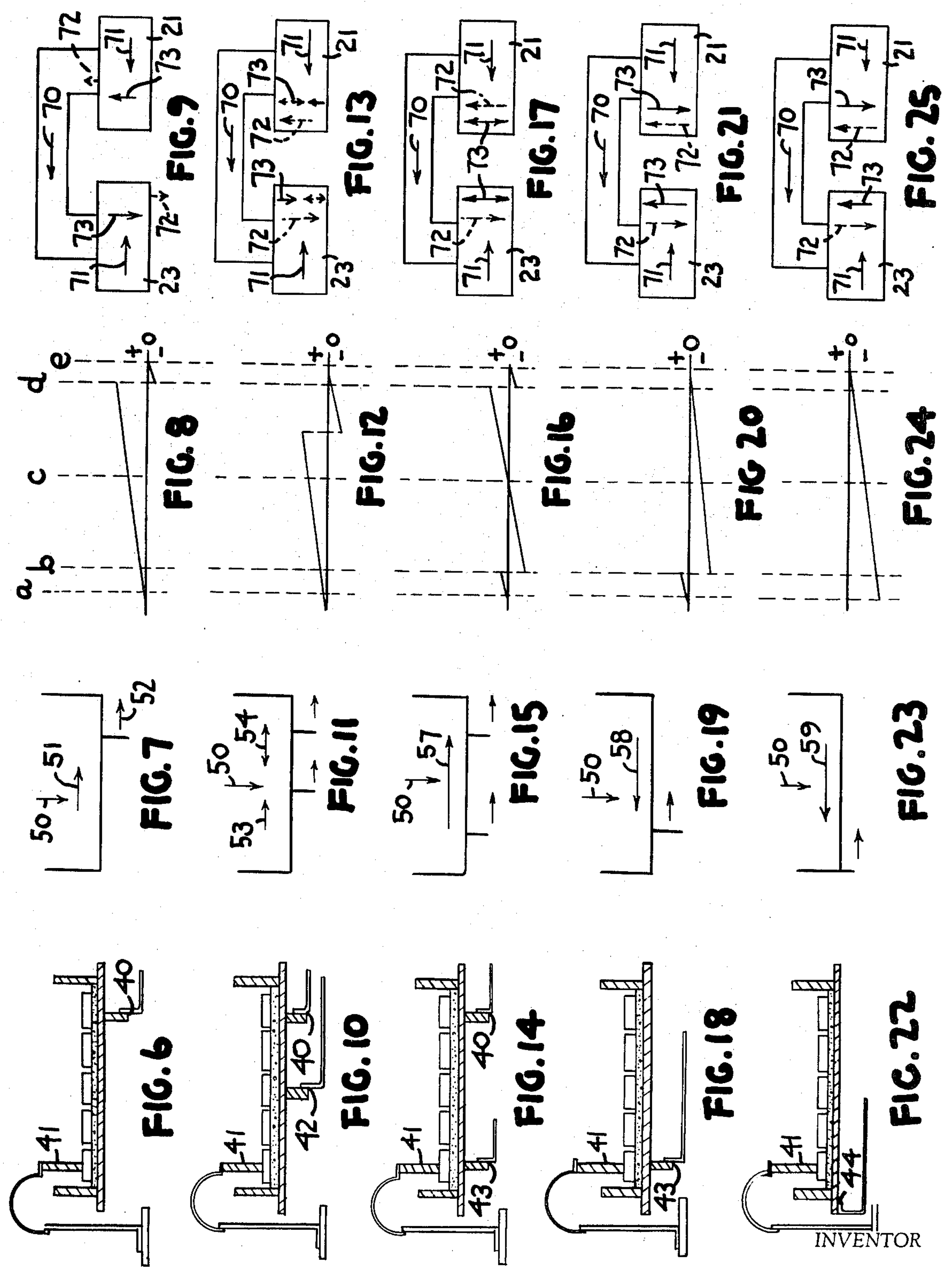
FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25
INVENTOR
JAMES G. PECK JR.
BY
Chisholm & Spencer
ATTORNEYS United States Patent Office 3,691,036

Patented Sept. 12, 1972

3,691,036

METHOD OF OPERATING A MERCURY-AMALGAM CATHODE ELECTROLYTIC CELL

James G. Peck, Jr., Lake Charles, La., assignor to PPG Industries, Inc., Pittsburgh, Pa.

Filed Mar. 9, 1970, Ser. No. 17,505
Int. Cl. B01k *1/00;* C01d *1/08*
U.S. Cl. 204—99 5 Claims

ABSTRACT OF THE DISCLOSURE

In the high current operation of a mercury-amalgam cathode electrolytic cell used for the electrolysis of aqueous alkali metal chloride solutions, an electromagnetic field is induced in the mercury-amalgam cathode to overcome the erratic performance of the cell.

Aqueous alkali metal chloride solutions, as lithium chloride, sodium chloride, and potassium chloride, are electrolyzed to yield alkali metal hydroxides and chlorine. This electrolysis is carried out commercially in two types of cells—the diaphragm cell and the mercury cell. A typical mercury cell is shown diagrammatically in FIG. 1.

A mercury cell has a conducting surface inclined slightly from the horizontal in the longitudinal direction. Typically, this conducting surface is a steel plate. A mercury amalgam film, usually about ⅛ of an inch to about ¼ of an inch or more in thickness, flows across this plate in the direction of the inclination of the plate. Flowing on top of the amalgam is the electrolyte, that is, the aqueous alkali metal chloride solution. Anodes, typically carbon anodes, or noble metal coated, or noble metal oxide coated titanium anodes, are usually spaced about ⅛ of an inch to about 3/16 of an inch above the mercury surface.

In a typical cell room, pluralities of such cells are arranged in series substantially as illustrated in FIG. 4. As there shown, two or more rows of cells are assembled in side-by-side relationship with the positive terminal of the power source being connected to the anode of the end cell of one row and the negative terminal of the said power source being connected to the cathode of the end cell of the other row. Each of the cells is connected in series, the cathode of one cell being connected to the anode of the next adjacent cell of the series.

At the opposite end of the rows a bus bar crosses from the cathode of the cell at such opposite end of one row to the anode of the end cell of the other row of cells. This bus bar is called the cross-over bus car. This cross-over bus bar is usually in the form of one or more strips of conductive metal, such as aluminum or copper, and extends in the longitudinal direction along the sides of the end cells, spaced therefrom, and usually substantially parallel thereto.

In a like manner, the terminals of the power source at the front end of the rows are connected to the front cells through similar bus bars which extend along the sides of the front end cells, separated therefrom, and substantially parallel to such sides.

Typically, there may be 30 to 80 cells in a cell room, forming what may be called a "cell circuit," although there may be more or less, and more rows of cells may be installed in a circuit. Generally, however, there are two rows of cells, and half of the cells are in each row.

In a normally running mercury-amalgam electrolytic cell, chlorine gas is liberated at the anode, and the alkali metal is liberated at the cathode, the alkali metal forming an amalgam with the mercury. It has been observed, however, that at high currents, on the order of about 150,000 amperes or more, flowing through the cells or bus bars, cell performance becomes highly erratic. Chlorine production drops. Large amounts of hydrogen are liberated. Currents surge to high levels. Carbon anode consumption becomes prohibitive as large quantities of carbon monoxide and carbon dioxide are liberated. In cells with metal or metallic oxide coated anodes, the coating is stripped off of the anodes. This effect is first observed at around 150,000 amperes and worsens with increasing amperage.

According to this invention, it has been found that this erratic behavior of the cells is due to the erratic behavior of the mercury cathode. It has now been found that at high currents the mercury no longer flows evenly along and down the base plate. Instead, bare spots develop on some areas of the plate while in other areas of the plate the mercury churns violently. This churning frequently becomes severe enough to allow the mercury to come into actual physical contact with the anodes, short circuiting the cell. The shorting causes the high consumption rate of the carbon anodes and the stripping of the metallic anodes, while the bare spots cause the liberation of hydrogen.

The four corner cells in the cell room, that is, the two cells nearest the power supply and the two cells nearest the cross-over bus bars, are the cells where this erratic behavior takes place or, at least, is most noticeable. The other cells, that is, the ones nearer the center of the cell room and more remote from the bus bars, appear to be unaffected or less affected by the erratic behavior of the corner cells.

According to this invention, it has now been found that this erratic performance of mercury cells during the electrolysis of alkali metal chloride solutions can be overcome by establishing and maintaining, during electrolysis, an electromagnetic field which is opposed to, and reduces the effect of, the electromagnetic field generated by current flow in the cross-over bus bars or in the power supply bus bars. Thus, the adverse effects which the externally induced electromagnetic fields generated in such bus bars may have on the mercury cathode are suppressed sufficiently, for example, by properly locating the input and output leads of the corner cells in different positions relative to each other, thereby providing for current flow in a different direction either through the mercury-amalgam cathode or through the cathode conducting surface, or through both. This changes the vector component of the electromagnetic fields operating on the amalgam cathode.

Controlling the direction of the horizontal component of the current flow to realize good cell operation and offset at least a portion of the electromagnetic fields induced in the amalgam cathode is especially appropriate when currents upwards of 150,000 amperes are supplied to the cells by a conductor, as a cross-over bus bar, which extends parallel to the direction of the flow of the mercury-amalgam electrode and is relatively close, say from about 1 to about 50 feet, from the end of the cells. Other factors, such as the mechanical problem of maintaining the inclined conducting surface perfectly flat, may, as a practical matter, limit the size of mercury-amalgam cells, thereby limiting the maximum current flow in mercury-amalgam electrolytic cells to about 750,000 amperes. Nevertheless, this invention is applicable to cell currents operating above such currents.

For a more complete understanding of the present invention, reference is made to the accompanying drawings in which:

FIG. 6 is a schematic side elevation of a typical mercury cathode electrolytic cell.

FIG. 7 shows the direction of the current flow in the cell shown in FIG. 6.

FIG. 8 shows the current distribution across the cell shown in FIG. 6.

Figure 1:
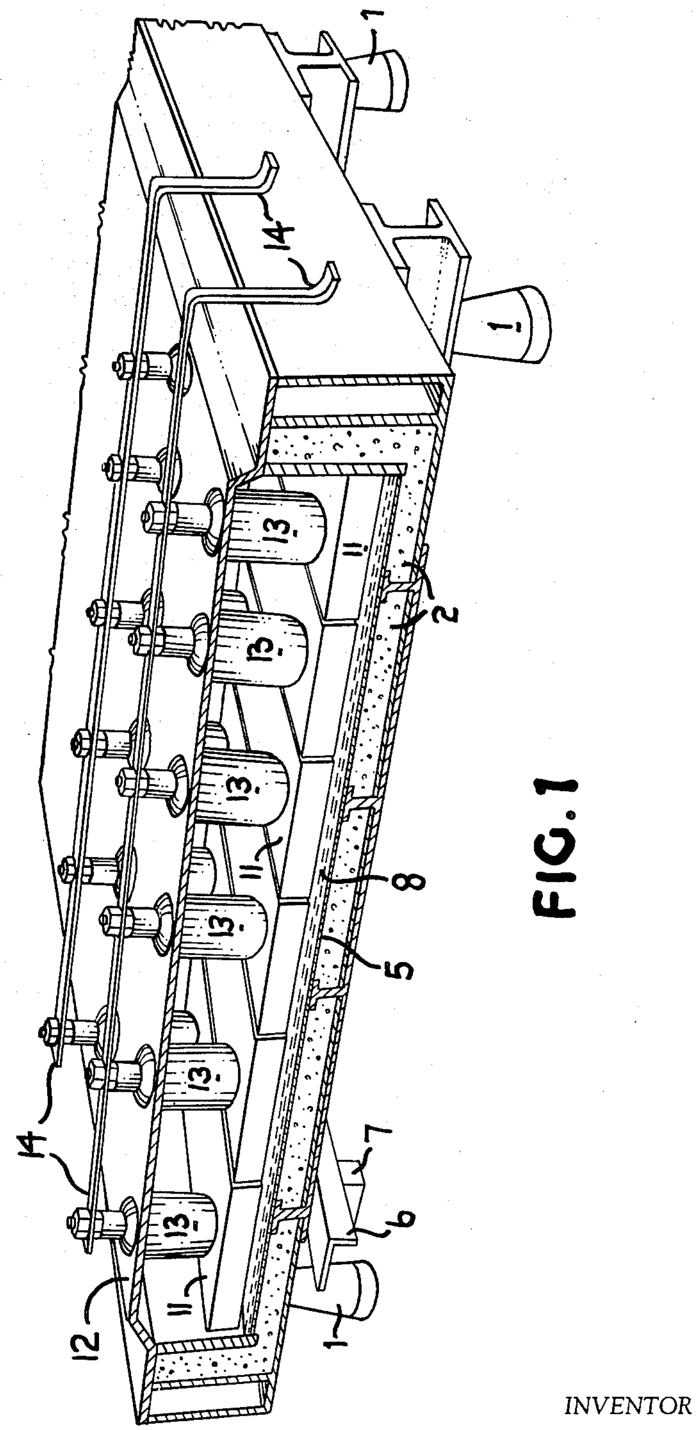
FIG. 1 is a cut-away diagrammatic drawing of a typical mercury electrolytic cell.
Figure 2:
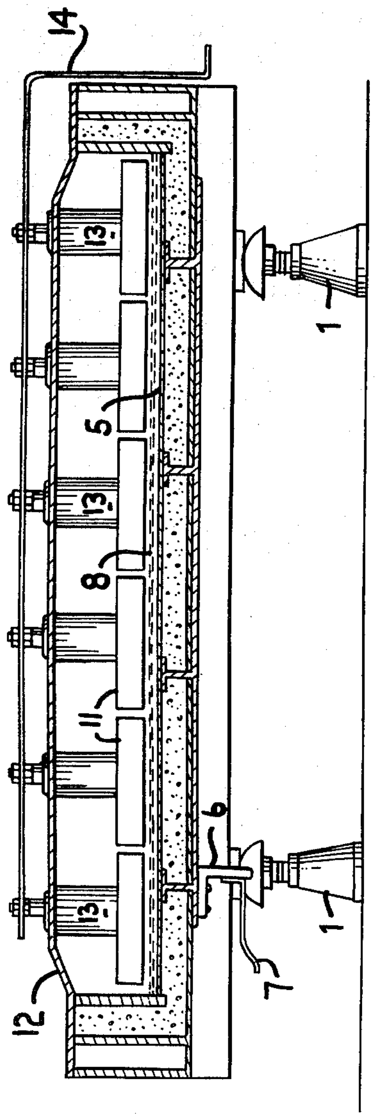
FIG. 2 is a sectional view along plane II—II of FIG. 1.

FIG. 9 diagrammatically shows two end cells, associated cross-over bus bars, and the directions of current and amalgam flows, respectivelffiy, for the cells of FIG. 6.

FIG. 10 is a schematic side elevation showing one embodiment of the present invention in which a cathode bus connection is made at a central area of the cell (near the longitudinal axis of the cell) as well as at the side opposite the anode connection.

FIG. 11 shows the direction of the current flow in the cell shown in FIG. 10.

FIG. 12 shows the current distribution in the cell shown in FIG. 10.

FIG. 13 diagrammatically shows two end cells, associated cross-over bus bars, and the directions of the current and amalgam flows for the cells of FIG. 10.

FIG. 14 is a schematic side elevation showing another embodiment of the present invention in which the cathode bus connection is made at the same side of the cell as the anode connection as well as at the opposite end of the cell.

FIG. 15 shows the direction of the current flow in the cell shown in FIG. 14.

FIG. 16 shows the current distribution across the cell shown in FIG. 14.

FIG. 17 diagrammatically shows two end cells, associated cross-over bus bars, and the direction of the current and amalgam flows for the cells of FIG. 14.

FIG. 18 is a schematic side elevation showing another embodiment of the present invention wherein the cathode bus connection is on the same side of the cell as the anode connection.

FIG. 19 shows the direction of the current flow in the cell shown in FIG. 18.

FIG. 20 shows the current distribution across the cell shown in FIG. 18.

FIG. 21 diagrammatically shows two end cells, associated cross-over bus bars, and the direction of the current and amalgam flows for the cells of FIG. 18.

FIG. 22 is a schematic side elevation showing an embodiment of the present invention wherein the cathode bus connection is at the same side of the cell as the anode connection but positioned outward of the anode connection.

FIG. 23 shows the direction of the current flow in the cell shown in FIG. 22.

FIG. 24 shows the current distribution across the cell shown in FIG. 22.

FIG. 24 shows the current distribution across the cell shown in FIG. 22.

FIG. 25 diagrammatically shows two end cells, associated cross-over bus bars, and the direction of the current and amalgam flows for the cells of FIG. 22.

FIGS. 6, 10, 14, 18, and 22 differ from each other principally in the location of the cathode bus connection or connections. FIGS. 7, 11, 15, 19, and 23 show the resulting direction of the current flow for each of the locations of the cathode bus connection with respect to the direction of the mercury flow. In FIGS. 8, 12, 16, 20, and 24 is a graph showing generally the magnitude of current at given points across the cell for each of the locations of the cathode bus connection. The vertical axis represents the amperage, and the horizontal axis represents the width of the cell. A current represented as being above the zero axis and having a positive value tends to produce a magnetic mercury flow counter to the gravitational mercury flow. A current flowing in the opposite direction, represented as being below the zero axis and having a negative value, tends to produce a magnetic mercury flow in the same direction as the gravitational mercury flow. In FIGS. 8, 12, 16, 20, and 24 the vertical axis represents relative magnitudes only and has no absolute significance. The horizontal coordinates *a*, *b*, *c*, *d*, and *e* represent locations across the width of the cell. Points *a* and *e* represent the edges of the cell. Points *b* and *d* represent intermediate points on the bottom of the cell. Point *c* represents the central area of the cell.

FIGS. 9, 13, 17, 21, and 25 show the directions of gravitational mercury flow, the current flow in the cross-over bus bars, the current flow in the cathode bus bars, and the current flow in the conducting surface and mercury amalgam. In FIGS. 9, 13, 17, 21, and 25, the arrows are for the purpose of indicating direction only and do not represent magnitudes or locations.

This invention is useful in improving the performance of the various mercury-amalgam cathode electrolytic cells known in the art. Various embodiments of mercury-amalgam cathode electrolytic cells are known in the art. In general, such cells have the simplified flow diagram shown in U.S. Pat. 2,544,138 granted Mar. 6, 1951. Other mercury-amalgam cathode cells are shown in U.S. Pat. 3,445,373, granted May 20, 1969; U.S. Pat. 3,042,602, granted July 3, 1962; U.S. Pat. 2,704,743, granted Mar. 22, 1955; and U.S. Pat. 2,550,231, granted Apr. 24, 1951, as well as in R. B. MacMullin, "Electrolysis of Brines in Mercury Cells," in Sconce, ed., Chlorine, Reinhold Publishing Co., New York, N.Y. (1962). A typical mercury-amalgam cathode electrolytic cell may be constructed substantially as shown in FIG. 1. The cell itself stands on insulated legs 1. The legs support the base of the cell 2. The base of the cell may be concrete or some other suitably chlorine-resistant material with the conducting steel plate 5 mounted directly on top of it. The sides of the cell are formed from vertical extensions of the base of the cell.

Figure 3:
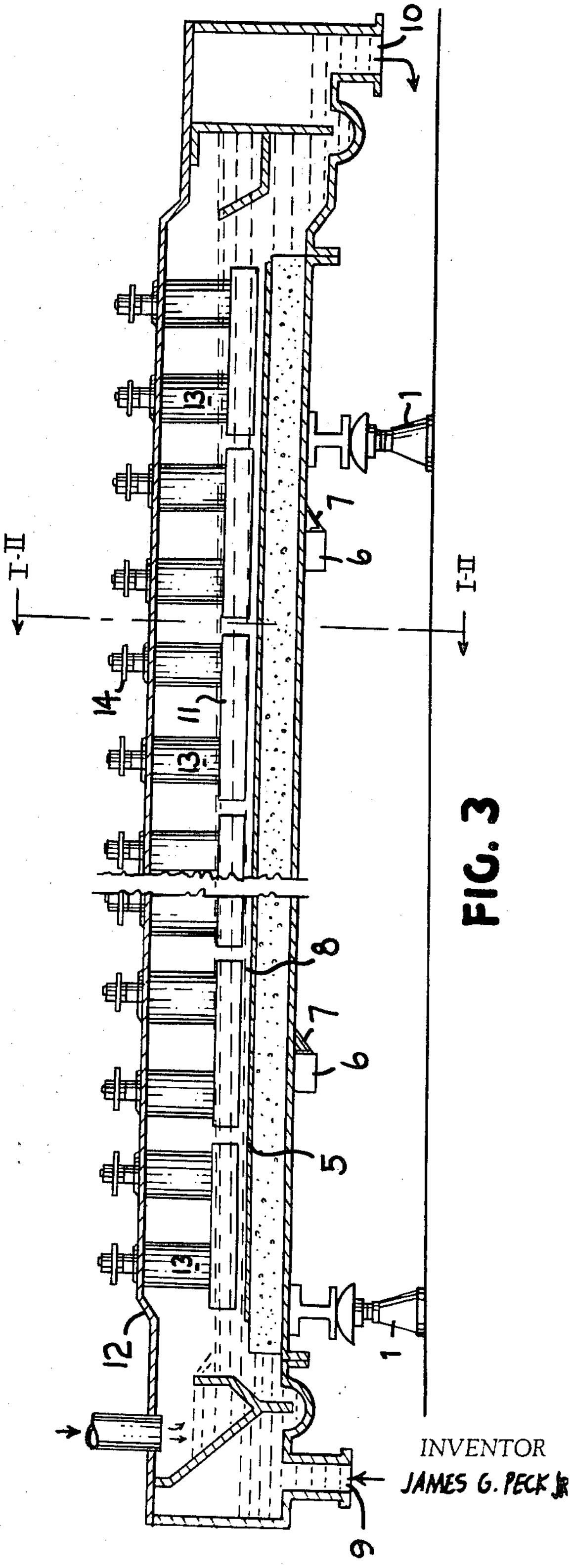
FIG. 3 is a sectional view along plane III—III of FIG. 2.

The conducting surface is typically a steel base plate inclined in the longitudinal direction, for example at an angle of about 1½° to about 2° from the horizontal as shown in FIG. 3. At various locations in the bottom of the cell are cathode conductors 6 connecting the steel plate to the cathode bus bar 7. The mercury-amalgam 8 flows as a thin stream along the upper surface of the steel plate in the direction of the inclination, its thickness often varying from about ⅛ inch to about ¼ inch. As illustrated in FIG. 3, the mercury is fed to cell at the higher end 9 of the base plate from a denuder. From there, under the influence of gravity, the mercury flows downwardly the length of steel plate 5 and exits to the denuder at the lower end 10 of the base. The flowing mercury is the cathode of the electrolytic cell, alkali metal being liberated at the mercury cathode and forming an amalgam with the mercury cathode. The mercury fed to the cell is lean in alkali metal, typically being essentially free of alkali metal, rarely having an alkali metal content of more than about .01 percent by weight, while the amalgam exiting the cell is richer in alkali metal, typically having an alkali metal content of about .2 to about .4 percent by weight.

Positioned a short distance above the amalgam, for example about ⅛ inch to about $\frac{3}{16}$ inch above the upper surface of the amalgam, are the anodes 11. The anodes may be either graphite or a suitably conducting metal with a corrosion-resistant, electrically conductive surface, or they may be of other conducting materials resistant to the electrolyte. A layer of aqueous alkali metal chloride electrolyte flows above the cathode, partially immersing the anodes. The alkali metal chloride may be lithium chloride, sodium chloride, or potassium chloride. It is usually sodium chloride. The aqueous alkali metal chloride, typically containing from about 200 to about 300 grams per liter of alkali metal chloride, flows on top of and in substantially the same direction as the amalgam. However, this invention is also useful in improving the performance of electrolytic cells where the flow of the electrolyte is diagonal to, or even countercurrent to, the flow of the amalgam.

As shown in FIG. 3, the alkali metal chloride solution, or electrolyte, enters the cell and flows, under the force of gravity, to the lower end 10 of the cell. A constant hydrostatic head of electrolyte, maintained by means well known in the art, provides a constant flow rate.

The anode stems 13 protrude through the top of the cell 12 and are connected to and support the anodes 11. Chlorine gas is evolved on the surface of the anode and rises through the electrolyte being recovered through suitable fittings (now shown) in the top of the cell. The anode stems 13 are electrical conductors that breach the top of the cell and electrically connect the anodes to the anode bus bars 14. The top of the cell 12 is constructed of flexible rubber or other suitable insulating, non-reactive, flexible material and mounted on top of the base structure. Above the top of the cell is a structure from which the anodes are adjustably mounted for the purpose of adjusting the spacing between the amalgam and the opposed anode surface.

There are other, equivalent, mercury-amalgam cathode electrolytic cell structures. For instance, the base member 2 may be eliminated, the conducting surface 5 sitting directly on the insulating legs 1. The conducting surface may be in the form of a flat plate 5 or it may be in the form of a trough or channel. When the conducting surface is in the form of a trough, the conducting surface may be joined directly to the top 12 at an insulated joint. The top 12 can be in one of various shapes. While one row of anode stems 13 per anode bus bar 14 is shown, one anode bus bar may service a plurality of anode stems or conductors. While in the cell illustrated in FIG. 1 six anodes 11 are shown longitudinally, present electrolytic cells may have various numbers of anodes across the width and length of the cell. The cathode conductor 6 may be in the form of an I-beam, extending the length of the cell, parallel to the mercury flow. The conductor may be connected with one or more bus bars 7 which may be spaced along the length of the conductor 6.

The flow of electric current in the cell is typically from an adjacent electrolytic cell. In the case of the corner cells in a cell room or cell circuit, as 20, 21, 22, and 23 in FIG. 4, the current flow is to or from opposite electrolytic cells, as 21 and 22, through long cross-over bus bars, as 24, 25, and 26 in FIG. 4, which are essentially parallel to the flow of the mercury amalgam. The current is fed to the anode bus bars 14 through the anode bus bars to the anode conductor 13, from the anode conductor to the anode 11, from the anode through the electroylte to the cathode 8. The current goes through the cathode to the base plate 5, from the base plate to the cathode conductors 6, and from the cathode conductors to the cathode bus bars 7. Then, for typical cells, the cathode bus bar conduct the current to an adjacent electrolytic cell. For the corner cells, as 20, 21, 22, and 23 of FIG. 4, current is conducted along long bus bars 24, 25, and 26, essentially parallel to the flow of mercury.

An electric charge in motion, as an electrical current flowing through a conductor, sets up a magnetic field in the space around it. The direction of the electromagnetic field so induced is given by the "Right Hand Rule," while the magnitude of the field at any point is given by the Biot-Savart Law. Typically in an alkali metal amalgam electrolytic cell, the anode bus bars 14 are above the cell, the cathode bus bars 7 are underneath the cell, and the conducting base plate 5 is within the cell. There is a horizontal current flow in each of or resulting from each of these conductors. Each of these horizontal current flows establishes a magnetic field around itself. The amalgam is subject to the cumulative effects of all three of these internally induced electromagnetic fields.

The amalgam is influenced both by fields generated by current flows within the cell and by fields generated by current flows outside the cell, i.e., in the cross-over bus bars and the power supply bus bars. The alkali metal amalgam in the end cells is most influenced by the external magnetic fields induced by the current flows in the cross-over or power supply bus bars running along the side of the cell. However, other fields which have a lesser influence are induced by the current flow in the anode bus bar and in the conducting surface. Other fields having a still lesser influence are induced by the current flow in the cathode bus bar.

The cumulative influence of the electromagnetic fields induced by the anode bus bar and the conducting surface is greater than the influence of the electromagnetic field induced by the cathode bus bar because of the different locations of these conductors relative to each other and to the flowing amalgam cathode. The anode bus bar extends across the top of the cell for about one-half of the width of the flowing amalgam cathode, and the conducting surface extends across the entire width of the flowing amalgam cathode. Therefore, the electromagnetic fields induced by the anode bus bar and conducting surface act essentially vertically on the flowing mercury-amalgam cathode.

By way of contrast, in a typical electrolytic cell the cathode bus bar extends under the conducting surface for only the minimum distance necessary to mechanically connect the cathode bus bar to the conducting surface. For example, a typical electrolytic cell may have cathode bus bars only at cathode conductor 40. Therefore, in a typical electrolytic cell the electromagnetic field induced by the cathode bus bar acts at an angle on the amalgam and, therefore, exerts less of an effect. It will be noted that since the cathode conductor (or conductors) 40 is located at the side of the cell, a substantial part of the current in the mercury flows toward the side of the cell having the current conductor, either through the mercury itself or through the conducting bottom. The direction of this flow for a typical cell is shown in FIG. 7.

Figure 4:
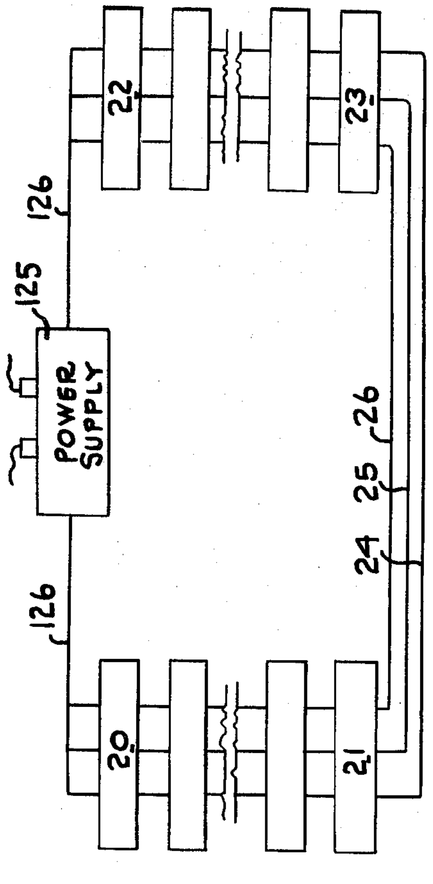
FIG. 4 is a diagrammatic layout of a typical mercury cathode cell room.

The electrolytic cells at the corners of the cell circuit or cell room cells, 21 and 23 in FIG. 4, are under the influence of electromagnetic fields induced by the current in the cross-over bus bars, 24, 25, and 26, and cells 20 and 22 are under the influence of the power supply bus bars 126. In accordance with this invention, it has been found that by controlling the internal currents, particularly the direction thereof, for example, by changing the location of the cathode bus bar with respect to the conducting surface and the amalgam, the electromagnetic field induced by the current flow in the cathode bus bars acts more directly on the amalgam. Accordingly, the direction of the electromagnetic field induced by the conducting surface is reversed or at least modified, whereby the effects of the externally induced electromagnetic fields, such as those induced by the power supply bus bars or the cross-over bus bars, can be reduced.

A mercury cell circuit is conventionally installed as illustrated in FIG. 4, with the cells in rows, and the individual cells being longitudinally aligned in side-by-side relationship.

Power source bus bars 126 run along the side of the cells adjacent to the power sources, from the power source to the cell anode connections. In like manner, the cross-over bus bars 24, 25, and 26 run along the opposite side of the end cells 21 and 23 which are located at the opposite ends of the rows.

In the interest of reducing the length of the bus bars between the cells, each cell has been installed essentially as illustrated in FIG. 6 with the anode bus bar coming from the cathode connection of the next adjacent cell up the series toward the positive side of the power source and a cathode conductor 40 running longitudinally along the bottom of the cell, adjacent to that side of the cell which is opposite to the side of the cell from which the anode bus bar comes. In this instance current flowing downward from the anodes mounted across the cell goes to the amalgam and then laterally through the amalgam and conducting surface to the cathode conductor at the side of the cell. This creates a gradually increasing amount of current flow through the amalgam and conductive plate in a direction 51 generally shown from left to right in FIG. 7. The cathode bus bar current flows in direction 52, to the next cell, or to the cross-over bus bars, from the far side of the cell, as shown by the arrow beneath the cell in FIG. 7.

As shown in FIG. 8, the current flowing through the amalgam and conducting surface gradually rises in a lateral direction from point *a* to point *d*. Point *d* is the locus of conductor 40. On the opposite side of the conductor, current flows in the opposite direction; that is, from point *e* to point *d*.

In FIG. 8, as well as FIGS. 12, 16, 20, and 24, current flowing in one direction is shown as positive or above the horizontal axis and current flowing in the opposite direction is shown as negative or below the horizontal axis. It has been observed that the current shown as positive tends to produce a magnetic flow of the mercury counter to the gravitational flow of the mercury, and the current shown as negative tends to produce a magnetic field that is in the same direction as that of the gravitational flow of the mercury.

FIG. 9 diagrammatically illustrates the current relationships in the end cells 21 and 23 of a conventional installation which end cells are opposite the cross-over bus bars 24, 25, and 26. Mercury flow in cell 23 flows in direction 71 toward the space between the two cells 21 and 23. At the same time, because of the location of the cathode conductor 40 shown in FIG. 6, current flows through the amalgam and the conducting surface in direction 73, that is, away from the side nearest the next adjacent cell in the row and toward the side nearest the bus bars 24 and 25.

Considering now the opposed cell 21, the mercury flows in direction 71 which is also from the outer end of the cell toward the central space between cells 21 and 23. Thus, the direction of mercury flow in cell 21 is opposite that in cell 23. Also, current flow through the amalgam and the conducting surface 5 is away from the side of the cell where cross-over bus bars 24, 25, and 26 are located because the cathode conductor is disposed on the side of the cell which is remote from the cross-over bus bars.

In this cell arrangement the erratic performance of the cells discussed above is encountered, especially in the corner cells.

The difficulties may be avoided according to this invention by providing means which change the overall direction of the current flow through the amalgam and the conducting surface 5, especially in the end cells. FIGS. 10, 14, 18, and 22 illustrate a suitable manner by which this may be accomplished. Thus, as shown in FIG. 10, a further cathode conductor is disposed longitudinally of the cell, essentially along the central longitudinal axis of the cell. This conductor 42 is in addition to conductor 40.

By making an additional cathode bus connection at 42 in FIG. 10, the horizontal component of the current flow is divided into two parts, 53 and 54 of FIG. 11. This produces a current distribution of the kind shown in FIG. 12 which rises to a lesser maximum than does the current distribution shown in FIG. 8 but still tends to produce a magnetic flow of the cathode opposite the gravitational flow of the cathode. The magnetic flow so produced is less than the magnetic flow produced in the arrangement of FIGS. 6 to 9. In such a case the current flows in cell

21 from the side of the cell remote from the cross-over bus bars toward the conductor 42 in the direction illustrated by arrow 53, and on the opposite side of the center of conductor 42 the current flows to both conductors 40 and 42 as generally illustrated by arrow 54. Also, current flows through the cathode bus bar from conductor 42 as shown by arrow 72 in FIG. 13. The flows of the mercury in cell 21 are shown by arrow 71 and the current flows are illustrated by arrows 73 and 72 of FIG. 13.

When the additional cathode conductor is disposed at the opposite edge of the cell, i.e., in cell 23 on the side remote from the cross-over bus bar, and in cell 21 on the side nearest such cross-over bus bar, as at 43 in FIG. 14, the horizontal component of the current flow is substantially as shown by 57 in FIG. 15. This gives a current distribution of the kind shown in FIG. 16. This current distribution imparts a magnetic flow to the cathode opposed to the gravitational flow of the cathode in that part of the cell where the horizontal component of the current flow in the mercury and the conducting surface is away from the cross-over bus bar in cell 21, and toward the cross-over bus bar in cell 23. A magnetic flow in the same direction as the gravitational flow is imparted to the cathode in that part of the cell where the horizontal component of the current flow is toward the anode connection 41 in FIG. 14. This is illustrated most clearly by the cathode-amalgam current 73 of FIG. 17.

Arrows 72 indicate the flow of the current underneath the cell, from the cathode conductors 40 and 43. In this embodiment, current flows toward both sides because of the location of conductors 40 and 43 on opposite sides. The magnitude of the magnetic field counter to the gravitational mercury flow is greatly reduced or cancelled out because of the lower magnitude and direction of the current flow as shown in FIG. 16.

If desired, cathode connector 40 may be eliminated and only a single connector, 43, provided. This is shown at 43 of FIG. 18. In this case, the horizontal component of the current flow in the cell is substantially opposite in direction to the direction of flow in the embodiment shown in FIGS. 6–9, inclusive, and is in the direction illustrated by arrow 58 in FIG. 19. As seen in FIG. 20, the resulting current distribution in the cell is such that the magnetic flow of the cathode is substantially the same as the gravitational flow of the cathode.

As seen in FIG. 21, the cathode bus bar current 72 resulting from the arrangement shown in FIG. 18 is substantially opposed to the amalgam current 73. The only part of the cell where the magnetic flow is opposed to the gravitational flow is that part of the cell between the cathode bus connection and the adjacent side of the cell, that is, the area between *a* and *b* in FIG. 20.

If, however, the cathode bus connection 44 in FIG. 22 (44 in FIG. 5) is made at or near the cell wall, the resulting horizontal component of the current flow in the cell is substantially as shown in FIG. 23. The directions of current flow through the amalgam and conducting surface are as shown by arrows 73 of FIG. 25, and the directions of the current flow through the bus bar conductor under the cell are as shown by arrows 72 of FIG. 25. The horizontal component of the current distribution is then substantially as shown in FIG. 24 and the magnetic flow of the cathode is in the same direction as the gravitational flow of the cathode throughout the entire cell.

Figure 5:
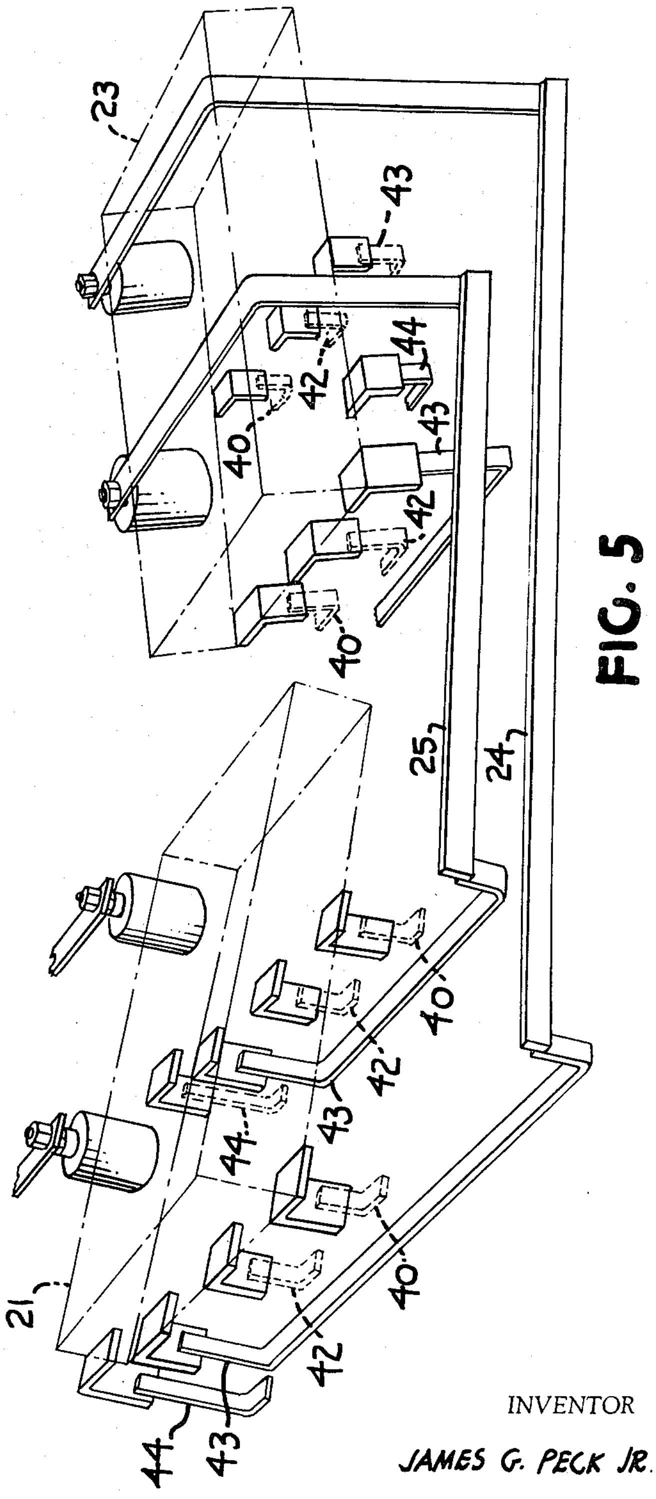
FIG. 5 is a diagrammatic view of two end cells in an electrolytic cell circuit, the actual slope of the cells being somewhat exaggerated, and the associated cross-over bus bar showing several embodiments of the invention.

As is especially evident from FIGS. 12, 16, 20, and 24, when the cathode bus bar connection is such that the cathode bus bar extends for one half or more of the width of the conducting base plate, as in FIGS. 10, 14, 18, and 22, or 42 of FIG. 5, the magnitude of the internally induced electromagnetic field in opposition to the gravitational flow of the cathode is substantially reduced and satisfactory operation of the cell above 150,000 amperes up to about 350,000 amperes or even higher is obtained. Even better results are obtained when the cathode connection is made at conductor 43 or 44 of FIGS. 18 or 22, respectively, so that all of the current flows as indicated in FIGS. 19, 23, 24, and 25, and the cathode bus bars leading from the cathode conductors extend under the cell for the entire width of the conducting base plate. The best results, especially above 350,000 amperes, are obtained when the cathode connection is made at a location such that all of the cathode bus bars extend substantially the entire width of the conducting base plate, as at 44 and FIGS. 22 through 25.

FIG. 5 diagrammatically illustrates in somewhat greater detail the arrangement of the two end cells 21 and 23 opposite the cross-over bus bars 24 and 25, using the cathode connectors 43 or 44 shown in either FIGS. 18 or 22, respectively. In cell 21 a plurality of cathode conductors 43 are connected to the cathode bus bars 30 leading to cross-over bus bars 24 and 25. These conductors 43 are either at or near the side of the cell remote from the cross-over bus bars.

Cell 21 and cell 23 are sloped in opposite directions so that mercury flows in opposite directions. Thus, in cell 23 the cathode connections 43 are disposed along the side nearest the cross-over bus bars.

It will be understood that the cathode conductors 43 may comprise spaced individual conductors as shown, connected to several bus bars, or one or more bus bars may be connected to a cathode conductor which extends along the entire length of the cell. While this drawing and discussion have emphasized the cells adjacent to the cross-over bus bars, it is clear that these comments apply equally to the cells adjacent to the power supply bus bars 126. That is, in cell 22, a cathode conductor 42, 43, or 44 is disposed at the center axis or at least nearer the side of the cell which is remote from the power source bus bars, this being similar to cell 21 of FIG. 5, and the cathode conductors of cell 20 being disposed nearer the side which is nearest to the power source bus bars.

The intermediate cells need not and in many cases will not have these precautions. Thus, they are usually constructed as indicated in FIG. 6 although the cathode conductors of these cells may be as illustrated in FIGS. 10, 14, 18, and 22, if desired.

It will be noted that in FIG. 5 connections 40 and 42 are shown with bus bars in phantom. These connections may be provided so that the other embodiments illustrated in FIGS. 10 and 14 may be resorted to.

In order that those skilled in the art may more completely understand the present invention and the preferred methods by which the same may be carried into effect, the following specific examples are offered.

EXAMPLE I

The contemplated room has 70 cells, arranged in two rows of 35 cells each, as shown in FIG. 4. The end cells have a conducting surface 6 feet wide by 68 feet long, inclined at an angle of 1.5° from the horizontal toward the center of the cell room. The cells are electrically connected in series, with the power source being connected to the anode of the first cell in the one row by bus bars.

The cells in the row are electrically connected to each other, cathode to anode. The cathode of the last cell in the row is connected to the anode of the opposite cell in the next row by cross-over bus bars as 24 and 25 of FIG. 5. The cells in this row are electrically connected to each other, cathode to anode, the cathode of the cell at the front of the row being connected to the power source. The power source bus bar is 9 feet from the sides of the front cells in the rows and joins the power source to the front cells in the rows.

The feed to the cells is a brine having from about 200 to about 300 grams per liter of sodium chloride and an amalgam having about .01 percent by weight sodium. The product is an amalgam having about .2 to about .4 percent sodium and 10 tons per day per cell of chlorine.

The two cells at the ends of the respective rows are connected to each other by cross-over bus bars. One cross-over bus bar joins one anode bus bar to one cathode bus bar. The cross-over bus bars, constructed of aluminum, are 1¼ inches by 20 inches in cross section. They have a center-to-center distance between bus bars of 2½ inches.

The bus bar nearest the side of the cells is 9 feet from the cell sides, the other bus bars being arranged outwardly therefrom. The cathode bus bars are connected to conductors 40 beneath and running substantially the entire length of the conducting surface on that side of the conducting surface requiring the shortest cathode bus bars and corresponding to 40 of FIG. 5. The circuit is operated at 150,000 amperes. At this current flow the end cells nearest the power source bus bars and the cross-over bus bars develop short circuits.

EXAMPLE II

The cell room of Example I is used except that the cathode bus bars in both end cells adjacent to the cross-over bus bars are run half way under the conducting surface perpendicular to the direction of the mercury flow and are connected to a conductor which is disposed substantially along the longitudinal central axis of the cell running the entire length thereof and corresponding to 42 in FIG. 5. In order to prevent short circuiting in the two end cells nearest the power source, they are shorted out of the system. The cell circuit can be operated at a current of 350,000 amperes without observing short circuiting in the end cells adjacent to the cross-over bus bars.

EXAMPLE III

The cell room of Example I is used except that the cathode bus bars in both of the end cells adjacent to the cross-over bus bars are run under substantially the entire width of the conducting surface perpendicular to the direction of the mercury flow and connected to conductor 43 on the side of the conducting surface requiring the longest cathode bus bars, running the entire length of the conducting surface and corresponding to 43 of FIG. 5. In order to prevent short circuits in the two cells nearest the power source, they are shorted out of the system. The cell circuit can be operated at 450,000 amperes and no seriously adverse effects will occur in the end cells adjacent to the cross-over bus bars.

EXAMPLE IV

Example II is repeated with the two front cells nearest the power source in the circuit. The cathode bus bars in both front cells adjacent to the power supply are run halfway under the conducting surface in a direction perpendicular to the mercury flow and connected to conductors midway across the width of the conducting surface, running the entire length thereof and corresponding to 42 in FIG. 5. The cell circuit can be operated at a current of 350,000 amperes before any short circuiting in the front cells nearest the power source will be observed.

EXAMPLE V

Example III is repeated with the two front cells nearest the power source in the circuit. The cathode bus bars in both of the front cells nearest the power supply are run substantially under the entire width of the conducting surface perpendicular to the direction of the mercury flow and connected to conductors on the side of the conducting surface requiring the longest cathode bus bar, running the entire length of the conducting surface in the direction of the mercury flow and corresponding to 43 in FIG. 5. The cell circuit can be operated at a current of 450,000 amperes before any seriously adverse effects will occur in the front cells adjacent to the power source.

EXAMPLE VI

The cell room of Example I is used. The cathode bus bar connectors of both of the end cells adjacent to the cross-over bus bars are installed under the conducting surface in diagonal relationship to the length of the cell so that at the end of the cell nearest the end of the opposite cell the cathode bus bar extends under the entire width of the conducting surface, while at the end of the cell furthest from the opposite cell the cathode bus bar does not extend under the conducting surface for an appreciable distance. Satisfactory performance is obtained at 400,000 amperes.

While there are described above a number of specific embodiments of the present invention, it is obviously possible to produce other embodiments and various equivalent modifications thereof without departing from the spirit of the invention. Having set forth the general nature and specific embodiments of the present invention, the scope thereof is now particularly pointed out in the appended claims.

I claim:

1. In the operation of an electrolytic cell used for the electrolysis of aqueous alkali metal chloride solutions and having a conducting surface, a cathode bus bar conducting electrical current from said cell, an electrical conductor joining said cathode bus bar to said conducting surface, a flowing alkali metal amalgam cathode flowing over said conducting surface, an aqueous alkali metal chloride electrolyte solution, a solid anode, an anode bus bar conducting electrical current to the said anode, an electrical conductor connecting said solid anode to said anode bus bar, the horizontal components of the current in said anode bus bar and in said cathode bus bar being in substantially the same direction, and perpendicular to the direction of flow of the said flowing alkali metal amalgam cathode, the anode bus bar being vertically opposed to said cathode bus bar, both of said bus bars internally inducing electromagnetic fields in the said alkali metal amalgam cathode, wherein said flowing mercury amalgam cathode is subjected to externally induced electromagnetic fields when the said electrolytic cell is operated at currents above 150,000 amperes, the improvement which comprises substantially counterbalancing the externally induced electromagnetic field in said flowing mercury amalgam cathode by controlling the internally induced electromagnetic field in said flowing mercury amalgam cathode.

2. The method of claim 1 wherein the internally induced electromagnetic field is controlled by locating the cathode bus bar conductor in vertical juxtaposition to the anode bus bar conductor.

3. The method of claim 2 wherein the internally induced electromagnetic field is controlled by locating the said cathode bus bar under one-half of the width of said conducting base plate.

4. In the process of producing chlorine and alkali metal hydroxide wherein an electric current is passed through an aqueous alkali metal chloride in an electrolytic cell having a flowing mercury amalgam cathode and wherein at least two of said cells are disposed in spaced end-to-end relationship and are connected in series, the cathode of one of said cells being connected to the anode of the other of said cells through a bus bar which extends along both of said cells, the improvement which comprises passing an electric current of at least 150,000 amperes through the cells and bus bar, flowing mercury from opposite ends of said cells through said cells toward the ends of the cells which are nearest each other and establishing in association with each of said cells a magnetic field which opposes the magnetic field generated by current flowing through said bus bar.

5. The process of claim 4 wherein the current which flows from anode to cathode in said cells is caused to flow laterally through the cathode elements in a direction transversely of the bus bar alignment and said direction in one of said cells is opposed to said direction of current flow in the other of said cells.

References Cited

UNITED STATES PATENTS

| | | | |
|---|---|---|---|
| 3,318,792 | 5/1967 | Cotton et al. | 204—99 X |
| 3,441,492 | 4/1969 | Fornoni | 204—250 X |
| 3,567,615 | 3/1971 | Nicolaisen | 204—250 X |
| 3,574,073 | 4/1971 | Ralston, Jr. | 204—219 X |

JOHN H. MACK, Primary Examiner

D. R. VALENTINE, Assistant Examiner

U.S. Cl. X.R.

204—128, 219